(12) United States Patent
Suga

(10) Patent No.: US 11,345,361 B2
(45) Date of Patent: May 31, 2022

(54) VEHICLE CONTROL DEVICE

(71) Applicant: TOYOTA JIDOSHA KABUSHIKI KAISHA, Aichi-ken (JP)

(72) Inventor: Shojiro Suga, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/110,292

(22) Filed: Dec. 3, 2020

(65) Prior Publication Data
US 2021/0197840 A1   Jul. 1, 2021

(30) Foreign Application Priority Data

Dec. 25, 2019   (JP) .............................. JP2019-234372

(51) Int. Cl.
*B60W 50/029*   (2012.01)
*G07C 5/02*   (2006.01)
(52) U.S. Cl.
CPC ............. *B60W 50/029* (2013.01); *G07C 5/02* (2013.01)
(58) Field of Classification Search
CPC ............................... B60W 50/029; G07C 5/02

USPC ........................................................ 701/29.2
See application file for complete search history.

(56) References Cited

U.S. PATENT DOCUMENTS

2014/0207347 A1\*   7/2014   Waku .................... F16H 61/702
701/54

FOREIGN PATENT DOCUMENTS

| JP | 2008128149 A | 6/2008 |
| JP | 2010238428 A | 10/2010 |
| JP | 2016176376 A | 10/2016 |
| JP | 2016217986 A | 12/2016 |

\* cited by examiner

*Primary Examiner* — Gertrude Arthur Jeanglaude
(74) *Attorney, Agent, or Firm* — Hauptman Ham, LLP

(57) ABSTRACT

The vehicle control device includes an arithmetic processing circuit configured to estimate a deterioration degree of a power transmission system component provided in a power transmission path between a drive source and wheels of a vehicle. The arithmetic processing circuit is configured to execute torque limit control that reduces an upper limit value of output torque of the drive source based on a scheduled maintenance date of the vehicle after a current date and an estimated value of the deterioration degree.

4 Claims, 4 Drawing Sheets

VEHICLE CONTROL DEVICE

CROSS-REFERENCE TO RELATED APPLICATION

This application claims priority to Japanese Patent Application No. 2019-234372 filed on Dec. 25, 2019, incorporated herein by reference in its entirety.

BACKGROUND

1. Technical Field

The present disclosure relates to a vehicle control device.

2. Description of Related Art

A device described in Japanese Unexamined Patent Application Publication No. 2008-128149 (JP 2008-128149 A) is known as a vehicle control device for improving a durability of a component of a power transmission system. In the vehicle control device described in JP 2008-128149 A, the degree of fatigue of the component of the power transmission system is calculated based on torque applied to the component, and torque of the engine is limited on condition that the degree of fatigue exceeds a certain value, thereby improving the durability of the component.

SUMMARY

As a cumulative value of the torque applied to the component increases, a life of the component leading to a fatigue failure is shortened. Even when the fatigue of the component progresses to a certain extent, the remaining life of the component is extended if a limit amount of the engine torque is increased so as to reduce the torque applied to the component. On the other hand, in a vehicle that is expected to be used for a long period, such as more than 10 years, when the component of the power transmission system is required to have a service life that is equivalent to the service life of the vehicle, torque limit by a significant amount will be required as the fatigue progresses, which results in reduction of a driving performance of the vehicle.

A vehicle control device according to an aspect of the present disclosure includes an arithmetic processing circuit configured to estimate a deterioration degree of a power transmission system component that is provided in a power transmission path between a drive source and wheels of a vehicle, and to execute torque limit control that reduces an upper limit value of output torque of the drive source based on a scheduled maintenance date of the vehicle after a current date and an estimated value of the deterioration degree.

As the torque applied to the power transmission system component increases, deterioration of the component progresses at an earlier rate. Therefore, by limiting the output torque of the drive source to suppress the torque applied to the component, further progression of the deterioration of the component can be suppressed. When the degree of the torque limit of the output torque of the drive source is not sufficient, there is a possibility that the deterioration of the power transmission system component exceeds an allowable limit while the vehicle is traveling. On the other hand, when the output torque of the drive source is excessively limited, a traveling performance of the vehicle is reduced, which results in reduction of drivability. When the vehicle receives a maintenance, it can be expected that the power transmission system component of which deterioration has progressed is repaired and replaced at the maintenance timing. Therefore, a minimum period during which the progress of deterioration exceeding the allowable limit should be delayed is a period up to the scheduled date of the maintenance. Accordingly, the torque limit control can be executed so as to delay progression of the deterioration of the power transmission system component exceeding the allowable limit to an appropriate timing based on the deterioration degree of the power transmission system component and the next scheduled maintenance date of the vehicle after the current date.

Here, a value of the deterioration degree when the deterioration of the power transmission system component has progressed to the allowable limit is a limit deterioration degree. The torque limit control may be executed in a mode as described below to limit the torque while reduction of the traveling performance of the vehicle is suppressed to the extent that the deterioration degree of the power transmission system component is kept below the limit deterioration degree until the next scheduled maintenance date. That is, in the vehicle control device according to the aspect of the present disclosure, the arithmetic processing circuit may be configured to estimate a current deterioration degree that is an estimated value of the deterioration degree at present and a next servicing time deterioration degree that is an estimated value of the deterioration degree on a next scheduled maintenance date of the vehicle while a value of the deterioration degree when deterioration of the power transmission system component progresses to reach an allowable limit is a limit deterioration degree. The arithmetic processing circuit may be configured to execute the torque limit control such that the upper limit value of the output torque is less than the upper limit value when a quotient obtained by dividing a difference obtained by subtracting the current deterioration degree from the limit deterioration degree by a difference obtained by subtracting the current deterioration degree from the next servicing time deterioration degree is smaller compared to when the quotient is a large value.

The next servicing time deterioration degree can be estimated by the arithmetic processing circuit in the mode as described below, for example. That is, in the vehicle control device according to the aspect of the present disclosure, the arithmetic processing circuit may be configured to calculate a product obtained by multiplying the current deterioration degree by "(X0+X1)/X0" as a value of the next servicing time deterioration degree, where a number of days of use of the power transmission system component to the current date is "X0" and a number of days from the current date to the next scheduled maintenance date is "X1".

Note that, when the deterioration degree of the power transmission system component is caused not to reach the limit deterioration degree until the next scheduled maintenance date and the next servicing time deterioration degree is less than the limit deterioration degree, there is no need for executing the torque limit control. Therefore, in the vehicle control device according to the aspect of the present disclosure, the arithmetic processing circuit may be configured to execute the torque limit control on condition that the next servicing time deterioration degree is equal to or greater than the limit deterioration degree.

When the deterioration degree of the power transmission system component is expected not to reach the limit deterioration degree on the next scheduled maintenance date but is expected to reach the limit deterioration degree by the next-next scheduled maintenance date, it is desirable to repair and replace the component at an earlier timing at the next maintenance timing if possible. However, if the vehicle is in good condition before the next maintenance, the user may forgo the next maintenance, and the opportunity for early repair and replacement of the component may not be obtained. In the vehicle control device according to the aspect of the present disclosure, the arithmetic processing circuit may be configured to estimate, in addition to the current deterioration degree and the next servicing time deterioration degree, a next-next servicing time deterioration degree that is an estimated value of the deterioration degree on a scheduled maintenance date after the next scheduled maintenance date. The arithmetic processing circuit may be configured to reduce the upper limit value of the output torque when the next-next servicing time deterioration degree is equal to or greater than the limit deterioration degree and the number of days from the current date to the next scheduled maintenance date is equal to or less than a predetermined number of days even in a case where the next servicing time deterioration degree is less than the limit deterioration degree. According to the vehicle control device of one aspect of the present disclosure, when the next scheduled maintenance date approaches, the upper limit value of the output torque is reduced and the traveling performance of the vehicle is reduced. Therefore, the user has an impression that the vehicle is not in good condition and the next maintenance is thus more likely to be performed as scheduled. Accordingly, the power transmission system component of which deterioration has progressed is more likely to be replaced at an early timing.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
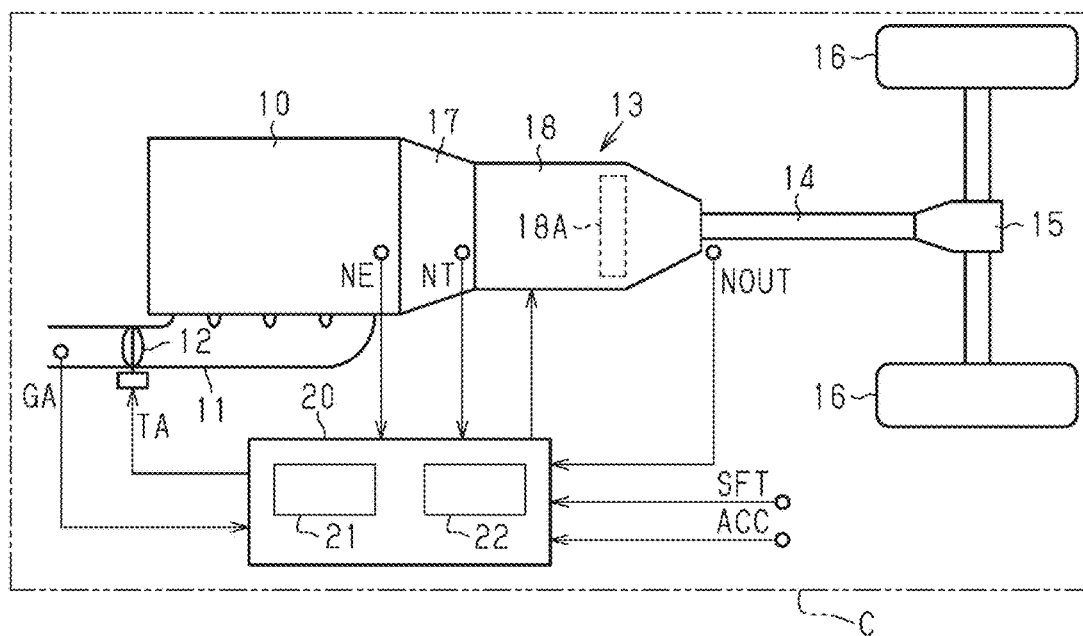
FIG. 1 is a drawing schematically showing a configuration of a vehicle control device according to a first embodiment.

Hereinafter, a first embodiment of a vehicle control device will be described in detail with reference to FIGS. 1 to 4. As shown in FIG. 1, a vehicle C to which a vehicle control device 20 of the first embodiment is applied includes an engine 10 as a drive source. A throttle valve 12 is installed in an intake passage 11 of the engine 10. Engine torque TE that is output torque of the engine 10 is adjusted through control of a throttle opening TA that is an opening of the throttle valve 12. The engine 10 is connected to right and left wheels 16 via an automatic transmission 13, a drive shaft 14, and a differential 15. The automatic transmission 13 includes a torque converter 17 that is a fluid coupling, and a stepped transmission mechanism 18 that includes a planetary gear mechanism. An input shaft of the stepped transmission mechanism 18 is coupled to an output shaft of the engine 10 via the torque converter 17. An output shaft of the stepped transmission mechanism 18 is coupled to the drive shaft 14.

The vehicle control device 20 that controls the vehicle C is configured as an electronic control unit that includes an arithmetic processing circuit 21 and a storage device 22. The arithmetic processing circuit 21 executes a process related to vehicle control. The storage device 22 stores a program and data to be used for the vehicle control. The vehicle control device 20 acquires various types of information about a traveling condition of the vehicle C from various sensors installed in respective portions of the vehicle C. The information acquired by the vehicle control device 20 includes information on operating conditions of the engine 10, such as the intake air amount GA of the engine 10 and an engine rotation speed NE. Further, the vehicle control device 20 includes information on conditions of the automatic transmission 13, such as a turbine rotation speed NT that is a rotation speed of the input shaft of the stepped transmission mechanism 18 and an output shaft rotation speed NOUT that is a rotation speed of the output shaft of the stepped transmission mechanism 18. Further, the information acquired by the vehicle control device 20 also includes information on the operation status of a driver such as the accelerator operation amount ACC that is a depression amount of an accelerator pedal and a shift position SFT that is an operation position of a shift lever. The vehicle control device 20 obtains a vehicle speed V that is a traveling speed of the vehicle C based on the output shaft rotation speed NOUT. The arithmetic processing circuit 21 reads and executes the program stored in the storage device 22 based on the acquired information such that the vehicle control device 20 executes various controls on the vehicle C. The vehicle control device 20 controls the engine torque TE that is the output torque of the engine 10 as a part of the engine control.

Figure 2:
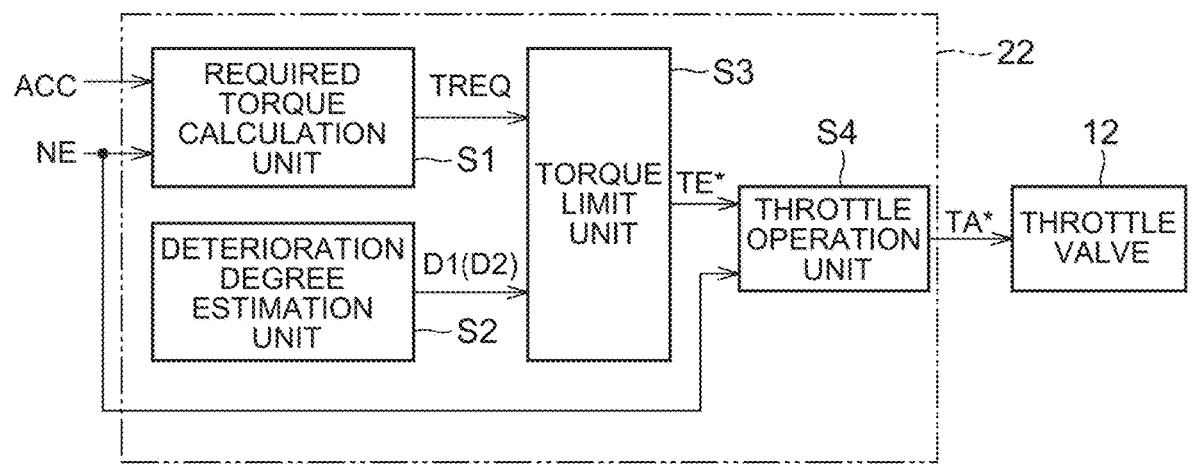
FIG. 2 is a block diagram of a control structure related to a control of engine torque in the vehicle control device.

FIG. 2 shows a control structure of the vehicle control device 20 that relates to the control of the engine torque TE. As shown in FIG. 2, the control structure that relates to the control of the engine torque TE includes a required torque calculation unit S1, a deterioration degree estimation unit S2, a torque limiting unit S3, and a throttle operation unit S4.

The required torque calculation unit S1 calculates a required torque TREQ that is a required value of the engine torque TE based on the accelerator operation amount ACC and the engine rotation speed NE in each predetermined control cycle. Specifically, when calculating the required torque TREQ, the required torque calculation unit S1 first calculates a maximum torque TMAX according to an engine rotation speed NE. The required torque calculation unit S1 then calculates the value of the required torque TREQ as a value that increases as the accelerator operation amount ACC increases from the value "0" that is the value when the accelerator operation amount ACC is 0 to maximum torque TMAX that is the value when the accelerator pedal is depressed to the maximum.

The deterioration degree estimation unit S2 estimates a next servicing time deterioration degree D1 that is the degree of deterioration of a power transmission system component at the next maintenance timing of the vehicle C. The component with which deterioration progresses to an allowable limit at the earliest rate is selected as the power transmission system component herein from the components of the power transmission system of the vehicle C that constitute a power transmission path to the engine 10 and the wheels 16. In the first embodiment, the power transmission system component is a ring gear 18A that is coupled to the drive shaft 14 in the planetary gear mechanism that constitutes the stepped transmission mechanism 18.

The torque limiting unit S3 sets a target torque TE* that is a control target value of the engine torque TE after a torque limit control is executed based on the next servicing time deterioration degree D1. The throttle operation unit S4 then calculates, as a value of a target opening TA*, the throttle opening TA at which the engine torque TE corresponding to the target torque TE* can be obtained based on the engine rotation speed NE and the target torque TE*. The throttle operation unit S4 drives the throttle valve 12 such that the throttle opening TA approaches the target opening TA*.

Estimation of Next Servicing Time Deterioration Degree

Estimation of the next servicing time deterioration degree D1 performed by the deterioration degree estimation unit S2 will be described in detail. When estimating the next servicing time deterioration degree D1, the deterioration degree estimation unit S2 first calculates a current deterioration degree D0 that is an estimated value of a current deterioration degree of the ring gear 18A. The ring gear 18A is the power transmission system component as described above. The current deterioration degree D0 of the ring gear 18A is calculated in the following manner That is, when calculating the current deterioration degree D0, the deterioration degree estimation unit S2 first calculates a gear rotation speed based on the output shaft rotation speed NOUT. The gear rotation speed is a rotation speed of the ring gear 18A per unit time. Next, the deterioration degree estimation unit S2 calculates the product obtained by multiplying input torque of the stepped transmission mechanism 18, a gear ratio of the stepped transmission mechanism 18, and a power transmission efficiency of the stepped transmission mechanism 18 as a value of gear input torque that is torque applied to the ring gear 18A. The deterioration degree estimation unit S2 then calculates, as a value of a gear load, the product obtained by multiplying the power that has the gear input torque as a base and a predetermined gear load coefficient as an exponent by the gear rotation speed.

The deterioration degree estimation unit S2 calculates the gear load in each predetermined calculation cycle. Further, when the value of the gear load calculated in the calculation cycle exceeds a fatigue limit load that is the upper limit value of the gear load at which deterioration of the ring gear 18A does not progress, the deterioration degree estimation unit S2 adds a difference obtained by subtracting the fatigue limit load from the calculated gear load to the value of an integrated deterioration degree. The deterioration degree estimation unit S2 then calculates the quotient obtained by dividing the integrated deterioration degree by a limit deterioration degree that is preset, as the value of the current deterioration degree D0. The limit deterioration degree indicates a value of the integrated deterioration degree when the ring gear 18A has deteriorated up to the allowable limit. Therefore, the value of the current deterioration degree D0 when the ring gear 18A is in a state where the ring gear 18A has deteriorated up to the allowable limit is "1". Note that, the value of the current deterioration degree D0 at the time of factory shipment of the vehicle C is set to "0". Further, when the ring gear 18A is replaced during maintenance of the vehicle C, the value of the current deterioration degree D0 is reset to "0".

Further, the deterioration degree estimation unit S2 calculates the product obtained by multiplying the current deterioration degree D0 by "(X0+X1)/X0" as the value of the next servicing time deterioration degree D1. "X0" indicates the number of days during which the ring gear 18A has been used up to the current date, and "X1" indicates the number of days counted from the current date to the next scheduled maintenance date of the vehicle C. The next scheduled maintenance date is calculated by any of the following methods (i) to (iii).

(i) In the case where the maintenance of the vehicle C is regularly performed, the date among the dates of adding the multiple of the maintenance cycles to the factory shipment date or the registration date of the vehicle C that is later than the current date and is the closest to the current date is set as the next scheduled maintenance date.

(ii) In the case where a manufacturer or a maintenance company of the vehicle C stores the information of a maintenance history of each vehicle C in a server accessible by the vehicle control device 20 and discloses the information, the date of adding the maintenance cycle to the latest maintenance date of the vehicle C that is obtained from the server is set as the next scheduled maintenance date.

(iii) In the case where the maintenance company stores the information on the next scheduled maintenance date of each vehicle C in a server accessible by the vehicle control device 20 and discloses the information, the next scheduled maintenance date is acquired from the server.

As described above, the current deterioration degree D0 estimated by the deterioration degree estimation unit S2 is indicated as "0" in the state where the ring gear 18A is not deteriorated at all, and as "1" in the state where the ring gear 18A has deteriorated up to the allowable limit, as the estimation results of the current deterioration degree of the ring gear 18A. Further, the next servicing time deterioration degree D1 indicates the estimation result of the deterioration degree of the ring gear 18A on the next scheduled maintenance date of the vehicle C in a similar or same mode as the current deterioration degree D0. For the current deterioration degree D0 and the next servicing time deterioration degree D1, "1" is a value corresponding to the limit deterioration degree.

Torque Limit Control

Figure 3:
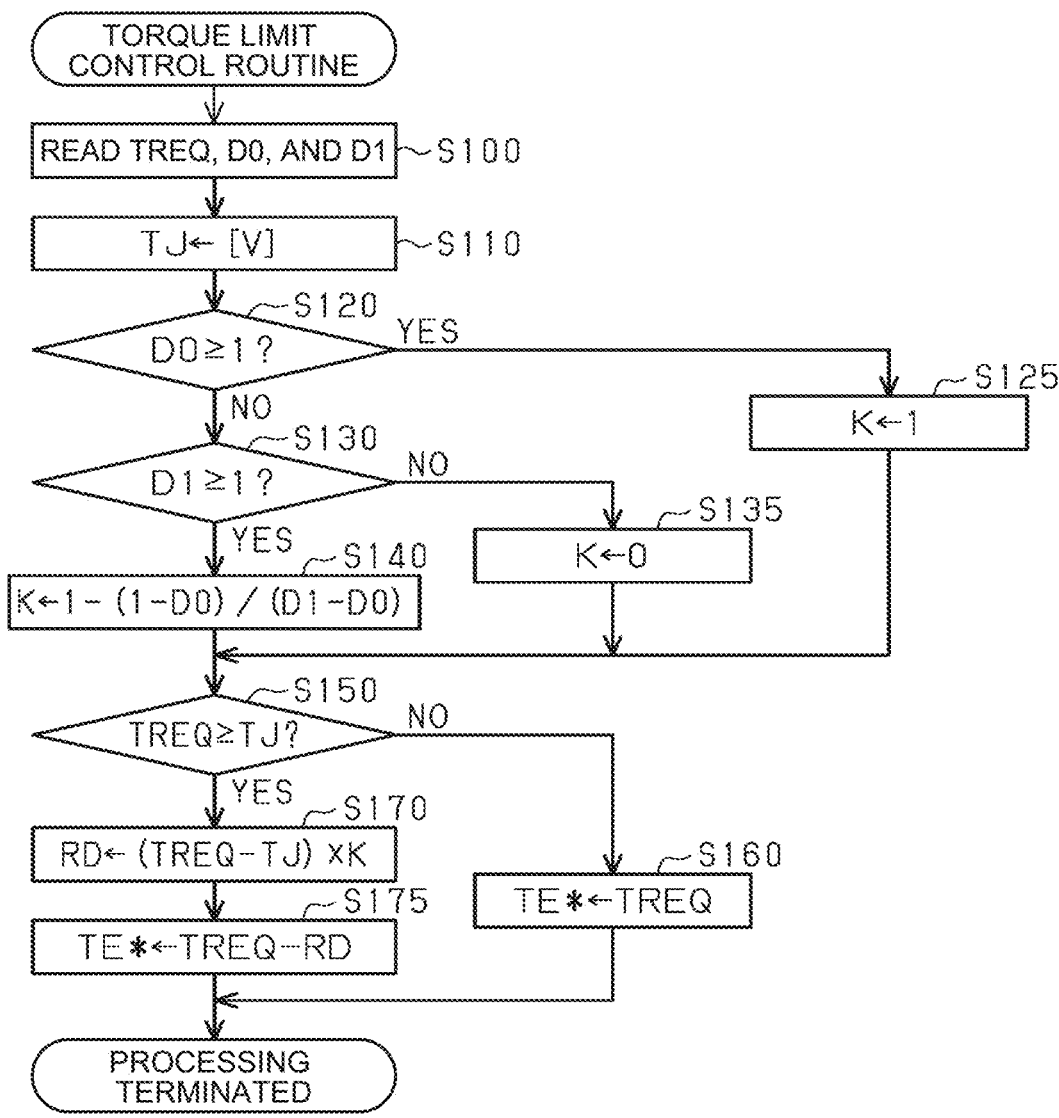
FIG. 3 is a flowchart of a torque limit control routine executed by the vehicle control device.

FIG. 3 shows a flowchart of a torque limit control routine executed by the torque limiting unit S3. During the operation of the engine 10, the torque limiting unit S3 repeatedly executes processing of this routine in every predetermined control cycle.

Figure 4:
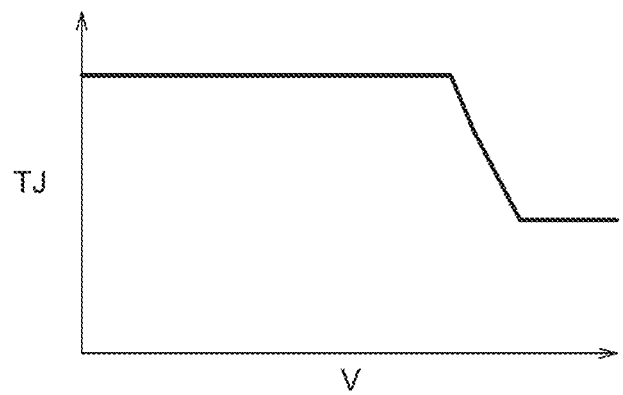
FIG. 4 is a graph showing a relationship between a protection control determination torque and a vehicle speed that is set in the torque limit control routine.

When the processing of this routine is started, first, in step S100, the required torque TREQ calculated by the required torque calculation unit S1, the current deterioration degree D0 estimated by the deterioration degree estimation unit S2, and the next servicing time deterioration degree D1 are read. Next, in step S110, a value of a protection control determination torque TJ is calculated based on the vehicle speed V. The value of the protection control determination torque TJ is calculated such that the input torque of the ring gear 18A becomes the upper limit value of the engine torque TE at which the progress of deterioration of the ring gear 18A becomes substantially "0". That is, the value of the engine torque TE at which the gear load reaches the fatigue limit load is calculated as the value of the protection control determination torque TJ. As shown in FIG. 4, the protection control determination torque TJ is calculated to be a smaller value when the vehicle speed V is high compared to that when the vehicle speed V is low.

Next, in a step S120, whether the current deterioration degree D0 is "1" or more is determined. When the current deterioration degree D0 is "1" or more (S120: YES), that is, when the ring gear 18A has deteriorated beyond the allowable limit, "1" is set as a value of a torque limit rate K in step S125, and then the routine proceeds to step S150. On the other hand, when the current deterioration degree D0 is less than "1" (S120: NO), the routine proceeds to step S130.

When the routine proceeds to step S130, whether the next servicing time deterioration degree D1 is "1" or more is determined in step S130. When the next servicing time deterioration degree D1 is less than "1" (S130: NO), "0" is set as the value of the torque limit rate K in step S135, and then the routine proceeds to step S150. On the other hand, when the next servicing time deterioration degree D1 is "1" or more (S130: YES), a value that satisfies the relationship of Equation (1) with respect to the current deterioration degree D0 and the next servicing time deterioration degree D1 is calculated as the value of the torque limit rate K in step S140. After that, the routine proceeds to step S150.

$$K=1-(1-D0)/(D1-D0) \quad (1)$$

When the routine proceeds to step S150, whether the required torque TREQ is greater than or equal to the protection control determination torque TJ is determined in step S150. When the required torque TREQ is a value that is less than the protection control determination torque TJ (S150: NO), the value of the required torque TREQ is set as the value of the target torque TE* as it is, in step S160, and the processing of the routine in this cycle is terminated. On the other hand, when the required torque TREQ is greater than or equal to the protection control determination torque TJ (S150: YES), the product obtained by multiplying the difference obtained by subtracting the protection control determination torque TJ from the required torque TREQ by the torque limit rate K is calculated as the value of a torque limit amount RD in step S170. In step S175, after the difference obtained by subtracting the torque limit amount RD from the required torque TREQ is calculated as the value of the target torque TE*, the processing of the routine in this cycle is terminated.

The torque limiting unit S3 writes in the storage device 22 information indicating that the ring gear 18A has deteriorated close to or beyond the allowable limit when a value other than "0" is set as the value of the torque limit rate K. Meanwhile, at the maintenance timing of the vehicle C, a procedure as follows is determined: to confirm whether the information above is written in the storage device 22 and to replace the ring gear 18A when written.

The operation of the first embodiment will be described. When the required torque TREQ is less than or equal to the protection control determination torque TJ, the torque limiting unit S3 in the vehicle control device 20 according to the first embodiment sets the value of the required torque TREQ as the value of the target torque TE* as it is. Further, when the required torque TREQ exceeds the protection control determination torque TJ, the torque limiting unit S3 calculates the product obtained by multiplying the difference that is obtained by subtracting the protection control determination torque TJ from the required torque TREQ by the torque limit rate K, as the value of the torque limit amount RD, and sets the difference obtained by subtracting the torque limit amount RD from the required torque TREQ as the value of the target torque TE*. The upper limit value of the target torque TE* that is set as described above, that is, the upper limit value of the engine torque TE, varies depending on the value of torque limit rate K.

Figure 5:
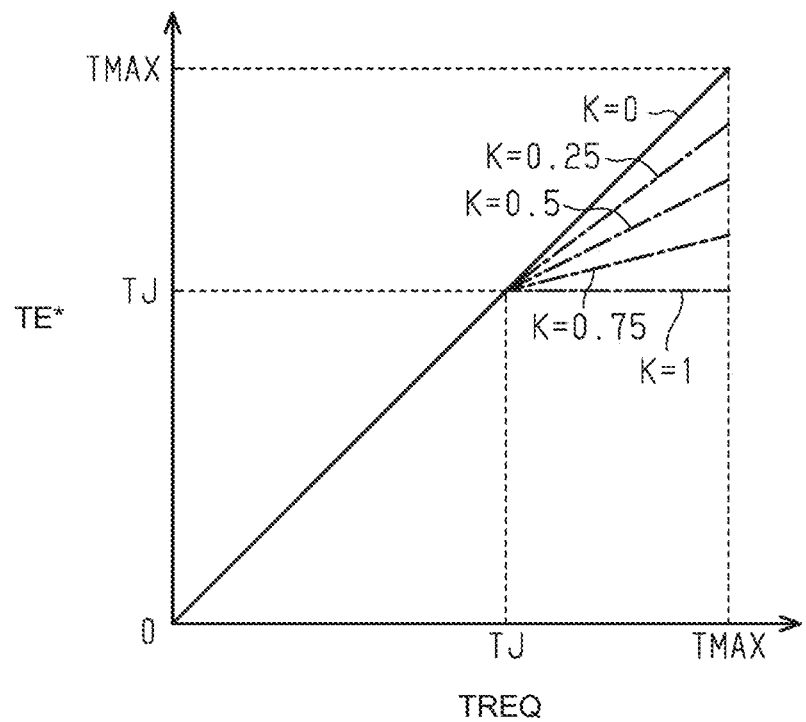
FIG. 5 shows a relationship between required torque and target torque in each of the cases where a torque limit rate K is "0", "0.25", "0.5", "0.75", and "1"

FIG. 5 shows a relationship between the required torque TREQ and the target torque TE* in each of the cases where the torque limit rate K is "0", "0.25", "0.5", "0.75", and "1". In a region where the required torque TREQ is equal to or greater than the protection control determination torque TJ, a difference (1−K) obtained by subtracting the torque limit rate K from "1" indicates the ratio of an increase amount of the target torque TE* to an increase amount of the required torque TREQ, that is, an inclination of a straight line indicating the relationship between the required torque TREQ and the target torque TE* in FIG. 5. The upper limit value of the target torque TE*, and thus the upper limit value of the engine torque TE, are reduced from the maximum torque TMAX that is the value when the torque limit rate K is "0" to the protection control determination torque TJ that is the value when the torque limit rate K is "1" as the torque limit rate K increases from "0" to "1".

Further, the torque limiting unit S3 in the vehicle control device 20 according to the first embodiment sets "0" as the value of the torque limit rate K when the next servicing time deterioration degree D1 is less than "1", that is, when it is expected that deterioration of the ring gear 18A does not reach the allowable limit by the next scheduled maintenance date. At this time, the required torque TREQ is set as the value of the target torque TE* as it is. On the other hand, the torque limiting unit S3 sets "1" as the value of the torque limit rate K when the current deterioration degree D0 is "1" or more, that is, when the deterioration of the ring gear 18A has already progressed beyond the allowable limit. At this time, because the protection control determination torque TJ is the upper limit value of the target torque TE*, the deterioration of the ring gear 18A can be kept under the current conditions.

Further, when the current deterioration degree D0 is less than "1" and the next servicing time deterioration degree D1 is "1" or more, that is, when the deterioration of the ring gear 18A is currently within the allowable range but the deterioration of the ring gear 18A is expected to reach the allowable limit by the next scheduled maintenance date, the torque limiting unit S3 sets the value that satisfies the relationship of Expression (1) as the value of the torque limit rate K. The value of the torque limit rate K at this time is as follows.

The deterioration of the ring gear 18A progresses when the engine torque TE is equal to or greater than the protection control determination torque TJ. As an excess amount of the engine torque TE with respect to the protection control determination torque TJ (=TE−TJ) increases, the degree of progress of the deterioration becomes greater. The following is herein assumed. That is, when the engine torque TE becomes equal to or greater than the protection control determination torque TJ, the deterioration of the ring gear 18A progresses by an amount proportional to the excess amount of the engine torque TE with respect to the protection control determination torque TJ.

Further, in the torque limit control routine as described above, when the required torque TREQ is equal to or greater than the protection control determination torque TJ, the torque limiting unit S3 calculates the product obtained by multiplying the difference that is obtained by subtracting the protection control determination torque TJ from the required torque TREQ by the torque limit rate K, as the value of the torque limit amount RD, and sets the difference obtained by subtracting the torque limit amount RD from the required torque TREQ as the value of the target torque TE*. That is, the target torque TE* at this time is set as a value that satisfies a relationship of Expression (2).

$$TE^* = TREQ - RD = TREQ - (TREQ - Tj) \times K \qquad (2).$$

Therefore, the excess amount of the target torque TE* with respect to the protection control determination torque TJ (=TE*−TJ) at this time is a value that satisfies a relationship shown by Equation (3). That is, the excess amount of the target torque TE* with respect to the protection control determination torque TJ (=TE*−TJ) at this time is "1−K" times of the excess amount of the required torque TREQ with respect to the protection control determination torque TJ (=TREQ−TJ). Therefore, a progression speed of deterioration of the ring gear 18A when a value other than "0" is set as the value of the torque limit rate K is a speed "1−K" times of the speed when "0" is set as the value of the torque limit rate K. Therefore, the progression speed of deterioration of the ring gear 18A when the value that satisfies the relationship of Expression (1) is set as the value of the torque limit rate K is a speed "(1−D0)/(D1−D0)" times of the speed when "0" is set as the value of the torque limit rate K.

$$\begin{aligned}
TE* - TJ &= TREQ - (TREQ - TJ) \times K - TJ \\
&= TREQ \times (1 - K) - TJ \times (1 - K) \\
&= (TREQ - TJ) \times (1 - K)
\end{aligned} \qquad (3)$$

Figure 6:
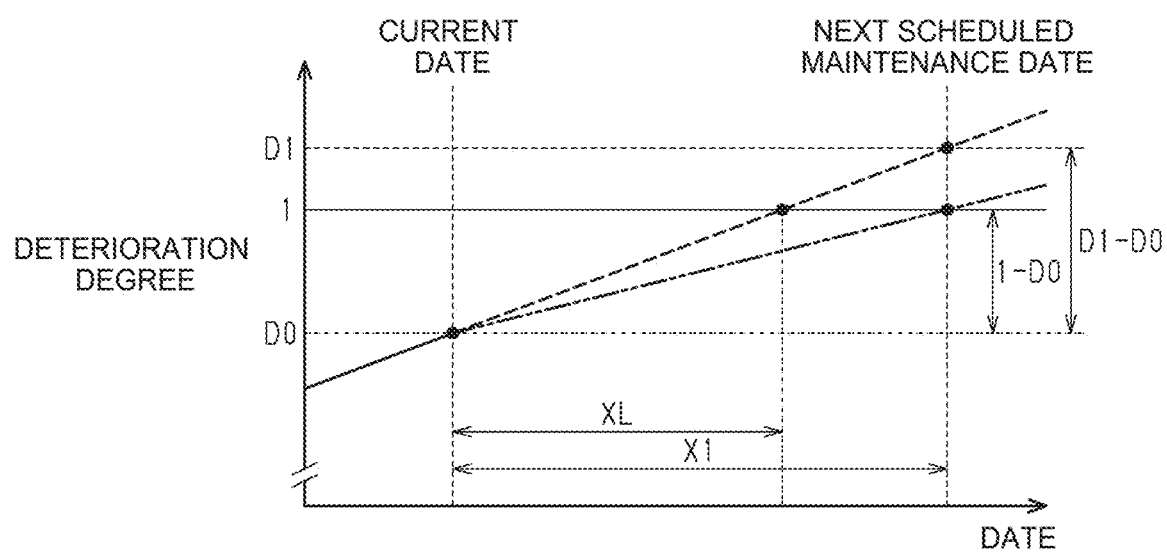
FIG. 6 is a diagram showing a mode of setting the torque limit rate K when a next servicing time deterioration degree exceeds "1" in the vehicle control device according to the first embodiment.

As shown in FIG. 6, the deterioration degree of the ring gear 18A when the value that satisfies the relationship of Expression (1) is set as the value of the torque limit rate K reaches "1" on the next scheduled maintenance date of the vehicle C. That is, the deterioration of the ring gear 18A at this time reaches the allowable limit on the next scheduled maintenance date of the vehicle C. As described above, in the first embodiment, when the deterioration of the ring gear 18A is currently within the allowable range but it is expected that the deterioration of the ring gear 18A reaches the allowable limit by the next scheduled maintenance date, the torque of the engine 10 is limited such that the deterioration of the ring gear 18A reaches the allowable limit on the next scheduled maintenance date.

As described above, in the first embodiment, the torque of the engine 10 is limited such that the deterioration of the ring gear 18A reaches the allowable limit on the next scheduled maintenance date of the vehicle C based on the next scheduled maintenance date. On the other hand, progression of the deterioration of the ring gear 18A reaching or exceeding the allowable limit can be suppressed only by limiting the torque of the engine 10 from the time when the current deterioration degree D0 reaches "1", with the protection control determination torque TJ as the upper limit value. In the torque limit control routine described above, this corresponds to that the determination process in step S130 is omitted, and when the current deterioration degree D0 is less than "1" (S120: NO), the process always proceeds to step S135 and "0" is set as the value of the torque limit rate K. However, when the current deterioration degree D0 has reached "1", further progression of the deterioration of the ring gear 18A has already been unacceptable. Therefore, the torque limit to the greater extent that is enough to suppress further progression of the deterioration of the ring gear 18A is suddenly started from the state where the torque limit is not imposed on the torque of the engine 10 at all. A traveling performance of the vehicle C is greatly reduced with the sudden start of the operation, which makes the user feel uncomfortable. On the other hand, in the first embodiment, on assumption that the deteriorated ring gear 18A is replaced at the next maintenance timing, the torque limit is imposed on the torque of the engine 10 within the range in which the deterioration of the ring gear 18A does not reach the allowable limit prior to the next scheduled maintenance date. Therefore, the torque limit for protecting the ring gear 18A can be imposed on the torque of the engine 10 in such a manner that the user does not feel uncomfortable.

The vehicle control device 20 according to the first embodiment described above can achieve the following effects.

The torque limit is imposed on the engine torque TE such that the deterioration of the ring gear 18A does not exceed the allowable limit prior to the next scheduled maintenance date of the vehicle C. Therefore, reduction of the traveling performance of the vehicle C due to the torque limit of the engine torque TE for protecting the ring gear 18A can be suppressed within the range in which the deterioration of the ring gear 18A exceeding the allowable limit can be avoided until the next maintenance timing.

The first embodiment above can be modified and implemented as follows. In the first embodiment, when the current deterioration degree D0 is less than "1" and the next servicing time deterioration degree D1 is "1" or more, the value that satisfies the relationship of Equation (1) is set as the torque limit rate K based on the current deterioration degree D0 and the next servicing time deterioration degree D1. The torque limit rate K at this time may be set based on two days of "XL", "X1" shown in FIG. 6. As described above, "X1" is the number of days from the current date to the next scheduled maintenance date. On the other hand, "XL" indicates the number of days from the current date to the date when the deterioration of the ring gear 18A reaches the limit if the deterioration of the ring gear 18A progresses at the same pace as that during the period from the start of use of the ring gear 18A to the current date. The value of "XL" can be obtained as the product obtained by multiplying the number of days X0 after use of the ring gear 18A is started up to the current date by "(1−D0)/D0". In this case, the difference obtained by subtracting the quotient obtained by dividing "XL" by "X1" from "1" (=1−XL/X1) is obtained as the value of the torque limit rate K. In addition, the quotient obtained by dividing "XL" by "X1" (=XL/X1) is equal to the quotient obtained by dividing the difference obtained by subtracting the current deterioration degree D0 from the limit deterioration degree (=1−D0) by the difference obtained by subtracting the current deterioration degree D0 from the next servicing time deterioration degree D1 (=D1−D0).

Second Embodiment

Subsequently, a second embodiment of a vehicle control device will be described with reference to FIG. 7. As in the first embodiment, the vehicle control device of the second embodiment includes the required torque calculation unit S1, the deterioration degree estimation unit S2, and the torque limiting unit S3, and the throttle operation unit S4 as the control structure related to control of the engine torque TE. However, the deterioration degree estimation unit S2 in the second embodiment estimates a next-next servicing time deterioration degree D2 in addition to the next servicing time deterioration degree D1. The next-next servicing time deterioration degree D2 is an estimated value of the deterioration degree of the ring gear 18A at a scheduled maintenance timing after the next scheduled maintenance timing (hereinafter referred to as the next-next scheduled maintenance timing) of the vehicle C. The torque limiting unit S3 in the second embodiment executes the torque limit control based on the next-next servicing time deterioration degree D2 in addition to the required torque TREQ and the next servicing time deterioration degree D1.

Note that the deterioration degree estimation unit S2 of the second embodiment estimates the next-next servicing time deterioration degree D2 in the mode in accordance with the estimation of the next servicing time deterioration degree D1 as described above. Specifically, the deterioration degree estimation unit S2 calculates the product obtained by multiplying the current deterioration degree D0 by "(X0+X2)/X0" as the value of the next-next servicing time deterioration degree D2. Here, "X2" indicates the number of days from the current date to the next-next scheduled maintenance date of the vehicle C. The next-next scheduled maintenance date is calculated as the date obtained by adding the maintenance cycle to the next scheduled maintenance date as described above.

Figure 7:
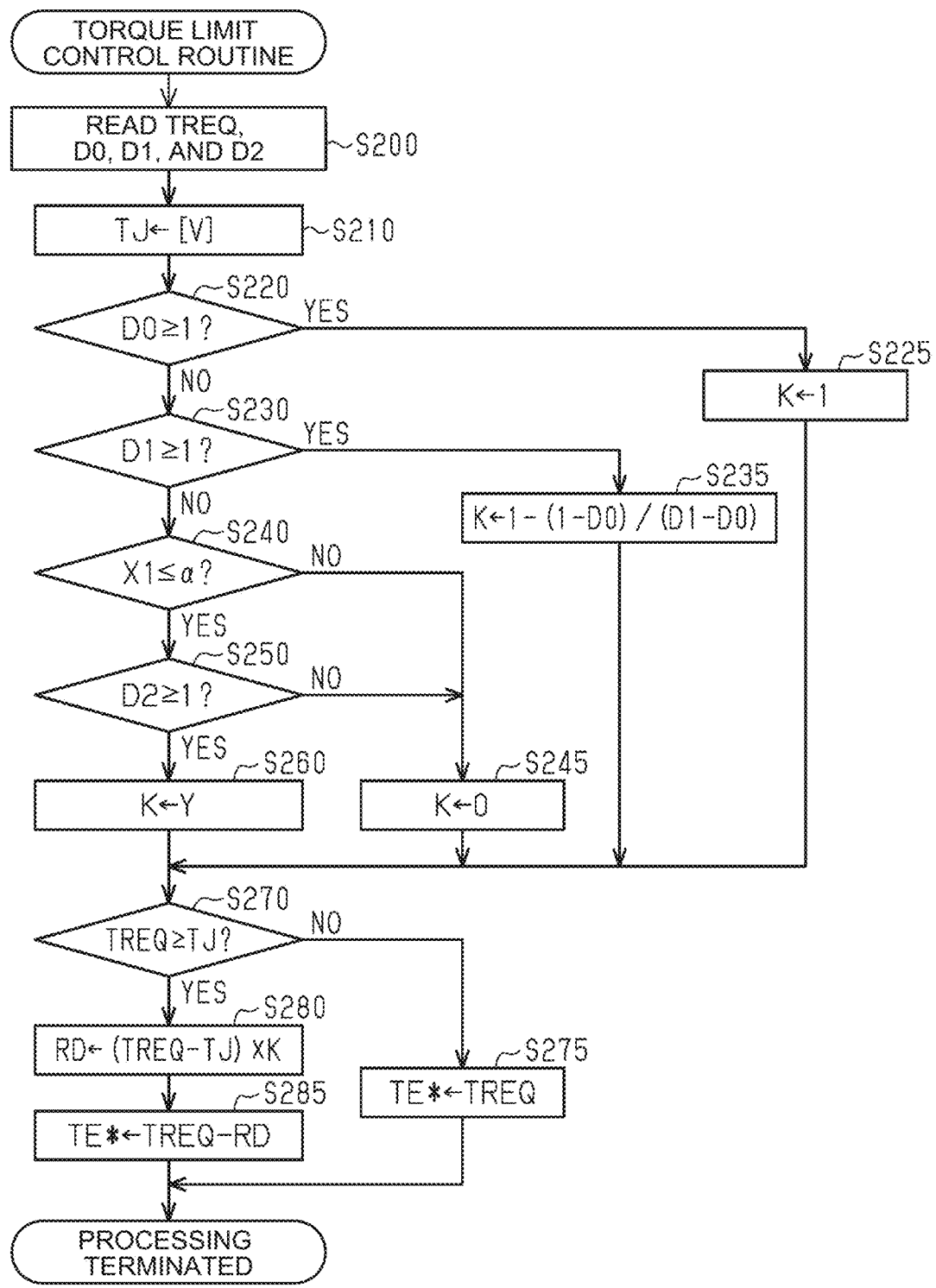
FIG. 7 is a flowchart of a torque limit control routine executed by a vehicle control device according to a second embodiment.

FIG. 7 shows a flowchart of the torque limit control routine in the second embodiment. During the operation of the engine 10, the torque limiting unit S3 repeatedly executes processing of this routine in every predetermined control cycle.

When the processing of this routine is started, first, in step S200, the required torque TREQ, the current deterioration degree D0, the next servicing time deterioration degree D1, and the next-next servicing time deterioration degree D2 are read. Next, in step S210, the protection control determination torque TJ is calculated based on the vehicle speed V. Also in the case of the second embodiment, the protection control determination torque TJ is calculated in a similar or same manner as that in the first embodiment.

Next, in step S220, whether the current deterioration degree D0 is "1" or more is determined. When the current deterioration degree D0 is equal to or greater than "1" (S220: YES), "1" is set as the value of the torque limit rate K in step S225, and then the routine proceeds to step S270. On the other hand, when the current deterioration degree D0 is less than "1" (S220: NO), the routine proceeds to step S230.

When the routine proceeds to step S230, whether the next servicing time deterioration degree D1 is "1" or more is determined in step S230. On the other hand, when the next servicing time deterioration degree D1 is "1" or more (S230: YES), the value that satisfies the relationship of Equation (1) above with respect to the current deterioration degree D0 and the next servicing time deterioration degree D1 is calculated as the value of the torque limit rate K in step S235, and the routine proceeds to step S270.

On the other hand, when the next servicing time deterioration degree D1 is less than "1" (S230: NO), whether the number of days X1 from the current date to the next scheduled maintenance date of the vehicle C is "α" or less is determined in step S240. When the number of days X1 exceeds "α" (S240: NO), "0" is set as the value of the torque limit rate K in step S245, and then the routine proceeds to step S270.

On the other hand, when the number of days X1 is equal to or less than "α" (S240: YES), the routine proceeds to step S250, and whether the next-next servicing time deterioration degree D2 is "1" or more is determined in step S250. At this time, when the next-next servicing time deterioration degree D2 is less than "1" (S250: NO), the routine proceeds to the step S245, and "0" is set as the value of the torque limit rate K in the step S245. The routine then proceeds to step S270.

On the other hand, when the next-next servicing time deterioration degree D2 is "1" or more (S250: YES), a predetermined value "Y" that is greater than "0" and less than "1" is set as the value of torque limit rate K in step S260. The routine then proceeds to step S270. The value of "Y" above is set to a value of the torque limit rate K, for example, "0.5", at which the torque limit is imposed to the extent that the user feels reduction of the traveling performance of the vehicle C.

When the routine proceeds to step S270, whether the required torque TREQ is equal to or greater than the protection control determination torque TJ is determined in step S270. When the required torque TREQ is the value that is less than the protection control determination torque TJ (S270: NO), the value of the required torque TREQ is set as the value of the target torque TE* as it is, in step S275, and the processing of the routine in this cycle is terminated. On the other hand, when the required torque TREQ is equal to or greater than the protection control determination torque TJ (S270: YES), the product obtained by multiplying the difference that is obtained by subtracting the protection control determination torque TJ from the required torque TREQ by the torque limit rate K is calculated as the value of the torque limit amount RD in step S280. In step S285, after the difference obtained by subtracting the torque limit amount RD from the required torque TREQ is calculated as the value of the target torque TE*, the processing of the routine in this cycle is terminated.

The operation of the second embodiment will be described. In the vehicle control device of the second embodiment, the torque limit control is executed in a similar or same mode as that in the first embodiment, except when the next servicing time deterioration degree D1 is less than "1" and the next-next servicing time deterioration degree D2 is "1" or more. In the vehicle control device 20 of the first embodiment, in the above case, that is, in the case where the deterioration of the ring gear 18A is expected not to reach the limit by the next scheduled maintenance date but is expected to reach the limit by the next-next scheduled maintenance date, the torque limit is not imposed on the torque of the engine 10. On the other hand, in the second embodiment, in the above case, the torque limit of the engine 10 is started from the date "α" days prior to the next scheduled maintenance date.

The deterioration of the ring gear 18A in the above case does not reach the limit on the next scheduled maintenance date but reaches the limit by the next-next scheduled maintenance date. Therefore, it is desirable to replace the ring gear 18A at the next maintenance timing. However, when the next maintenance is user optional, the user may cancel the next maintenance if the vehicle C is in good condition.

On the other hand, in the second embodiment, in the above case, when the number of days to the next scheduled maintenance date reaches "α" days, the torque limit of the engine 10 is started ahead of schedule. Consequently, the traveling performance of the vehicle C is reduced due to the torque limit, which makes the user feel that the vehicle C is not in a desired condition. Therefore, it is more likely that the next maintenance is performed as scheduled. Accordingly, the deteriorated ring gear 18A is more likely to be replaced at an early timing.

The first and the second embodiments above can be modified and implemented as follows. The first and the second embodiments and modification examples to be described below may be carried out in combination of each other within a technically consistent range. In each of the above embodiments, the protection control determination torque TJ is calculated based on the vehicle speed V. However, the protection control determination torque TJ may be calculated using other parameters related to the input torque of the ring gear 18A such as the accelerator operation amount ACC. Further, the protection control determination torque TJ may be a fixed value.

The next servicing time deterioration degree D1 or the next-next servicing time deterioration degree D2 may be obtained by a method different from the method described in the embodiments above. The upper limit value of the engine torque TE may be changed in accordance with the next servicing time deterioration degree D1 and the next-next servicing time deterioration degree D2 in a mode different from the embodiments above. For example, the upper limit value of the engine torque TE can be changed in accordance with the next servicing time deterioration degree D1 and the next-next servicing time deterioration degree D2 by, for example, calculating the upper limit value based on the next servicing time deterioration degree D1 and the next-next servicing time deterioration degree D2 and setting the target torque TE* having a value to be equal to or less than the calculated upper limit.

In the embodiments above, the engine torque TE is controlled by adjusting the throttle opening TA. However, the engine torque TE may be controlled by adjusting other parameters such as an ignition timing and a fuel injection amount.

In the embodiments above, the ring gear 18A provided in the stepped transmission mechanism 18 of the automatic transmission 13 is the power transmission system component that is the target of suppressing the progress of deterioration by the torque limit control. However, the torque limit control may be executed with the other components provided in the power transmission path between the engine 10 and the wheels 16 as the power transmission system components that are the target of suppressing the progress of deterioration.

The vehicle control device of the embodiments above can be applied to a vehicle provided with an automatic transmission or a manual transmission including a continuously variable transmission mechanism, instead of the automatic transmission 13 including the stepped transmission mechanism 18. The vehicle control device according to the embodiments above is applied to the vehicle C that includes the engine 10 as the drive source. However, the vehicle control device according to the embodiments above may be applied to an electric vehicle that uses a motor as a drive source and a hybrid vehicle that uses a hybrid system of a motor and an engine as a drive source. In such a case, by applying the control of the engine torque TE in the embodiments above to a control of the output torque of the drive sources in the vehicles above, reduction of the traveling performance of the vehicle caused by the torque limit of the output torque above can be suppressed to the extent that the deterioration of the power transmission system component that exceeds the allowable limit can be avoided prior to the next scheduled maintenance date.

What is claimed is:

1. A vehicle control device, comprising:
   an arithmetic processing circuit configured to estimate a deterioration degree of a power transmission system component that is provided in a power transmission path between a drive source and wheels of a vehicle, and to execute torque limit control that reduces an upper limit value of output torque of the drive source based on a scheduled maintenance date of the vehicle after a current date and an estimated value of the deterioration degree,
   wherein the arithmetic processing circuit is configured to:
      estimate a current deterioration degree that is an estimated value of the deterioration degree at present and a next servicing time deterioration degree that is an estimated value of the deterioration degree on a next scheduled maintenance date of the vehicle while a value of the deterioration degree when deterioration of the power transmission system component progresses to reach an allowable limit is a limit deterioration degree; and
      execute the torque limit control such that the upper limit value of the output torque is less than the upper limit value when a quotient obtained by dividing a difference obtained by subtracting the current deterioration degree from the limit deterioration degree by a difference obtained by subtracting the current deterioration degree from the next servicing time deterioration degree is smaller compared to when the quotient is a large value.

2. The vehicle control device according to claim 1, wherein the arithmetic processing circuit is configured to calculate a product obtained by multiplying the current deterioration degree by "(X0+X1)/X0" as a value of the next servicing time deterioration degree, where a number of days of use of the power transmission system component to the current date is "X0" and a number of days from the current date to the next scheduled maintenance date is "X1".

3. The vehicle control device according to claim 1, wherein the arithmetic processing circuit is configured to execute the torque limit control on condition that the next servicing time deterioration degree is equal to or greater than the limit deterioration degree.

4. The vehicle control device according to claim 3, wherein the arithmetic processing circuit is configured to:
   estimate, in addition to the current deterioration degree and the next servicing time deterioration degree, a next-next servicing time deterioration degree that is an estimated value of the deterioration degree on a scheduled maintenance date after the next scheduled maintenance date; and
   reduce the upper limit value of the output torque when the next-next servicing time deterioration degree is equal to or greater than the limit deterioration degree and the number of days from the current date to the next scheduled maintenance date is equal to or less than a predetermined number of days even in a case where the next servicing time deterioration degree is less than the limit deterioration degree.

* * * * *